United States Patent [19]
Kumar et al.

[11] Patent Number: 6,075,717
[45] Date of Patent: Jun. 13, 2000

[54] PWM RECTIFIER CONTROL WITH SWITCHING LOSSES EQUALLY DISTRIBUTED AMONG MULTIPLE SWITCHING DEVICES

[75] Inventors: Ajith Kuttannair Kumar, Erie, Pa.; Allen Barr Plunkett, Sherwood, Oreg.

[73] Assignee: General Electric Company, Erie, Pa.

[21] Appl. No.: 08/845,094

[22] Filed: Apr. 21, 1997

Related U.S. Application Data

[60] Provisional application No. 60/016,630, May 1, 1996.

[51] Int. Cl.$^7$ ...................................................... H02M 5/42
[52] U.S. Cl. ................................ 363/87; 363/37; 363/69; 363/128; 322/285
[58] Field of Search .................................. 363/37, 69, 70, 363/128, 34, 65, 71, 87, 129; 323/285

[56] References Cited

U.S. PATENT DOCUMENTS

| | | | |
|---|---|---|---|
| 4,435,750 | 5/1984 | Schutten et al. | 363/177 |
| 5,034,874 | 7/1991 | Araki | 363/41 |
| 5,373,223 | 12/1994 | Akagi et al. | 318/722 |
| 5,483,140 | 1/1996 | Hess et al. | 318/802 |
| 5,491,624 | 2/1996 | Levran et al. | 363/87 |
| 5,801,517 | 9/1998 | Borle | 323/207 |

*Primary Examiner*—Adolf Deneke Berhane
*Assistant Examiner*—Gary L. Laxton
*Attorney, Agent, or Firm*—Jill M. Breelove; James H. Buesse

[57] ABSTRACT

Switching losses are distributed equally between multiple switching devices in a rectifier bridge (50) in which the rectifier bridge comprises at least a first pair of serially connected switching devices (56A, 56B) connected between positive and negative DC output buses (52, 54) and a second pair of serially connected switching devices (58A, 58B) connected in parallel with the first pair of switching devices. Only one of the switching devices in each pair of switching devices is pulse width modulated at any time at a frequency substantially higher than a frequency of the AC power applied to the rectifier bridge while another of the switching devices in each pair of switching devices is operated in synchronism with the waveform of the AC power applied to the bridge. Operation further involves periodically alternating the PWM operation of the switching devices between switching devices in each pair of switching devices so as to distribute the losses. Preferably, the process of alternating between PWM modulated switching devices occurs at zero crossings of the AC waveform so as to minimize transience generated in the switching process.

20 Claims, 11 Drawing Sheets

PWM RECTIFIER CONTROL WITH SWITCHING LOSSES EQUALLY DISTRIBUTED AMONG MULTIPLE SWITCHING DEVICES

This application claims the benefit of U.S. Provisional application Ser. No. 60/016,630, filed May 1, 1996.

BACKGROUND OF THE INVENTION

The present invention relates to pulse width modulated rectifier systems and, more particularly, to an improved method and apparatus for control of such systems.

A conventional controlled rectifier for converting alternating current (AC) to direct current (DC) utilizes two pairs of serially connected switching devices with each pair connected in parallel between positive and negative voltage output busses. Reversely poled diodes bypass each switching device. AC power is coupled to the rectifier at junctions intermediate each pair of switching devices. The rectifier is operated in a pulse width modulation (PWM) mode which allows the output DC voltage to exceed the voltage which could be obtained using diodes alone. In this operational mode, pump-up inductors are coupled in circuit between the AC source and the rectifier. Switching devices are selectively gated into conduction such that the inductor is connected across the AC source to cause current to build up to some selected level. When the devices are switched off, the reactance of the inductor causes current to continue, which current is forced to flow to the DC output busses through the diodes.

There are some disadvantages to use of a PWM rectifier in the above described form. One disadvantage is that the switching devices must be operated at a higher frequency, e.g., such as at 500 Hz or higher in order to minimize losses due to harmonic currents. This higher frequency of operation increases losses in the switching devices. Another disadvantage is the generation of harmonics which can be introduced into the AC power system. This latter disadvantage is particularly noticeable when multiple, synchronized rectifiers are coupled to the AC power system such as may occur when the controlled rectifiers are used on transit cars to provide DC voltage which can be converted to controlled frequency AC power for driving AC electric traction motors.

During multiple transit car operation, the inductance and resistance of the catenary or third rail between cars is very small compared to the inductance of each transformer on board each transit car and the inductance of the pump-up reactor connected in series with the secondary of the transformer. Accordingly, the voltage at the transformer in each car will be substantially in phase and equal. Since the cars are connected to a common trainline so that the operator commands are the same for each car, the load represented by the electric traction motors on each car is substantially the same. Accordingly, each rectifier input voltage and its phase angle and the rectifier current and its phase angle are approximately the same for each car. If the angle difference between the voltage and current is relatively small, then the second harmonic will be shifted by twice the angle and the nth harmonic will be shifted by N times the angle if the control and modulation scheme are the same. When the number of transit cars and PWM rectifiers increases, the harmonic currents add linearly and may interfere with telephone and other communication signals along the transit car right of way.

SUMMARY OF THE INVENTION

The present invention provides a method and apparatus for reducing switching losses to any one switching device within a PWM rectifier; a method and apparatus for distributing switching losses equally among switching devices within a PWM rectifier; a method and apparatus for minimizing harmonic currents generated by PWM rectifier operation; a method and apparatus for phase locking the PWM rectifier operation to the power line frequency; a feed forward control system for improving the response of the system; a method and apparatus for compensating for transformer reactance in a PWM rectifier system without monitoring the primary voltage on the transformer; an averaging filter to eliminate harmonics in the control system; and a DC offset correction system for a PWM rectifier.

The present invention is illustrated in one form in a power control system for multiple electric traction motors on an electrically propelled transit car. The power system includes a power transformer coupled for receiving power from a wayside power source and having a secondary winding supplying electric power to one or more pulse width modulated (PWM) rectifiers. The PWM rectifiers are connected so as to be able to charge a DC link to a voltage higher than would normally be achieved by diode rectification of the AC input power. The DC link supplies direct current power to an inverter which generates controlled frequency AC power for application to AC electric traction motors on the vehicle. Each of the rectifiers comprises a plurality of semiconductor switching devices connected in two parallel paths across the DC link. For PWM control, at least two of the switching devices are gated into conduction concurrently so as to short circuit the transformer secondary winding to enable current through the winding to build up to some preselected higher value. Thereafter, one of the switching devices is switched out of conduction and allows the pumped-up current to be forced by the inductance in the transformer circuit into the DC link even though the DC link voltage may be higher than the transformer voltage. In the present invention, only one of the switching devices is modulated at the PWM frequency. The other switching device is maintained in conduction for an entire half-cycle of the AC input voltage. This technique minimizes the switching losses in the second switching device. During another cycle of the AC waveform, the first switching device may be held in continuous conduction and the second switching device modulated at the PWM frequency. In this manner, the switching losses are distributed between the two devices thereby reducing the heating losses normally incurred in PWM switching rectifier circuits. In still another feature of the present invention, each of the switching between the first and second rectifier occurs at zero crossings of the AC waveform in order to minimize the generation of low frequency harmonics into the AC power system. In still another feature of the present invention, a phase locked loop is utilized in the control of the PWM switching waveforms so as to synchronize the waveform to the AC input voltage. In still another feature of the present invention, the rectifiers are operated in a manner to maintain a minimum value of reactive current so that the current to the rectifier is in phase with the AC input voltage. In this latter embodiment, a control scheme is implemented in which computed values of voltage and current are fed forward in the control loop so as to improve control response.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
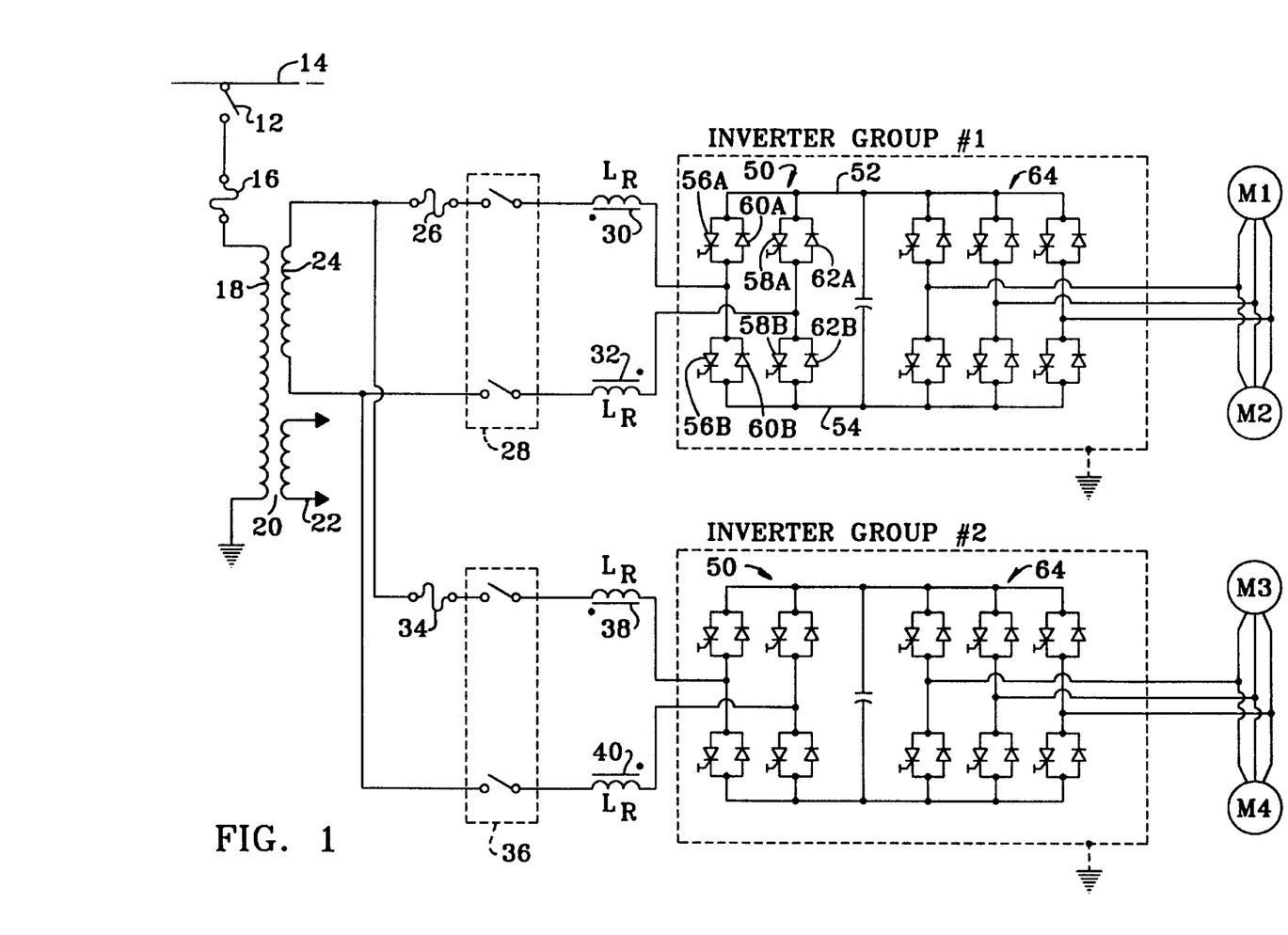
FIG. 1 is a schematic representation of an electric power system for electric traction motors of the type with which the present invention may be used.

Referring now to FIG. 1, there is shown an overall electrical diagram of an electric power system for a transit car with which the present invention may be used. The transit car typically includes a pantograph 12 which is adapted to make contact with an overhead catenary 14 which may carry 25,000 volts at 60 Hz. The voltage received at the pantograph is coupled through a circuit breaker 16 to a first terminal of a primary winding 18 of a power transformer 20. A second terminal of the primary winding 18 is coupled to ground through the axles and wheels of the transit car to the rails on which the transit car operates. In the illustrated embodiment, the transformer 20 includes an auxiliary winding 22 which supplies voltage to an auxiliary power system and a main winding 24 which supplies power to drive the transit car. The main winding 24 is connected through a fuse 26, a circuit breaker 28 and a pair of line reactors 30 and 32 to a first inverter group 1 which supplies power to a pair of traction motors M1 and M2. The transformer winding 24 is also coupled through another fuse 34, circuit breaker 36 and line reactors 38 and 40 to a second inverter group 2 which supplies power to traction motors M3 and M4. Each of the circuits between the transformer winding 24 and the inverter groups 1 and 2 are substantially identical. Further, each of the inverter groups 1 and 2 are identical. While FIG. 1 illustrates a single winding 24 for powering both inverter groups, there may be some advantages in using a transformer 20 having separate secondary windings for each inverter group, i.e., two windings 24 with each winding connected to a respective one of the inverter groups 1 and 2.

Each inverter group comprises a rectifier and an inverter. The rectifier, indicated generally at 50, includes two pairs of series connected switching devices coupled across a DC link illustrated as a relatively positive bus 52 and a relatively negative bus 54. Each of the series connected pairs of switching devices, illustrated at 56A, 56B and 58A, 58B may comprise gate turn off (GTO) devices. Each of the devices 56A, 56B and 58A, 58B is bypassed by a reversely poled diode 60A, 60B and 62A, 62B, respectively, coupled in parallel with the switching device. The DC busses 52 and 54 supply DC power to the inverter 64. Inverter 64 comprises a conventional three-phase inverter of a type well known in the art. In essence, each phase of the inverter is identical and comprises a pair of serially connected switching devices with reversing poled diodes connecting in parallel with each device. By gating the switching devices into conduction at predetermined times, a voltage is developed at the junction intermediate each switching device which approximates a sine wave. Each junction intermediate each pair of switching devices is connected to a respective phase winding of each of the motors M1 and M2. As can be seen from FIG. 1, the inverter group number 2 is identical to inverter group number 1 but has its output connected to respective phase windings of the motors M3 and M4. While two inverter groups are shown, it will be recognized that the two rectifiers could supply a common DC bus to which both inverters are connected.

In general, the rectifier 50 in each of the inverter groups utilizes the diodes 60 and 62 to establish the relatively positive and relatively negative voltage on the DC busses 52 and 54, respectively. In order to pump power into the DC link when the voltage of the DC link is higher than the instantaneous voltage available at the transformer secondary winding, the system uses a pump-up technique to force current through the series reactors 30, 32 and 38, 40. More particularly, if for example, the devices 56B and 58B are gated into conduction concurrently, the junctions intermediate the pairs of switching devices will both be connected to the negative voltage bus 54 thereby effectively short circuiting the secondary winding 24 of the transformer 20 through the line reactors 30 and 32. Consequently, current will rapidly build up in this closed circuit. If the switching device 56B is then gated out of conduction, the current through the inductive line reactors 30 and 32 will be forced through the diode 60A returning through the diode 62B so that current is forced into the DC link. During the reverse half cycle of the AC waveform from the secondary winding, the switching devices 56A and 58A can be operated in the same manner to achieve the same kind of result. More particularly, if the switching devices 56A and 58A are both gated into conduction simultaneously, the transformer secondary winding will be short circuited through the line reactors 30, 32 to the DC bus 52 allowing current to build up in the line reactors 30 and 32. If device 58A is then gated out of conduction, the current will be forced to flow into the DC link through the diodes 62A and 60B bypassing each of the associated switching devices. Which pair of switching devices 56A, 58A and 56B, 58B is gated into conduction in order to short-circuit the AC input circuit can be varied as will be described with regard to FIG. 4 to minimize heating losses in the devices.

The switching devices 56 and 58 are controlled so as to regulate the DC voltage on the busses 52 and 54 (the "DC link") to a constant value. A secondary function of the rectifiers is to control the phase angle between the current in the secondary winding of the transformer and the voltage on the transformer so that the reactive current is essentially zero. In other words, it is desirable to have the secondary current in phase with the primary voltage. If the switching devices in the rectifier are controlled so as to also regulate the voltage across the line reactors 30 and 32, the desirable result of having the secondary current and primary voltage in phase can be achieved. The control does not correct for magnetizing current.

Figure 2:
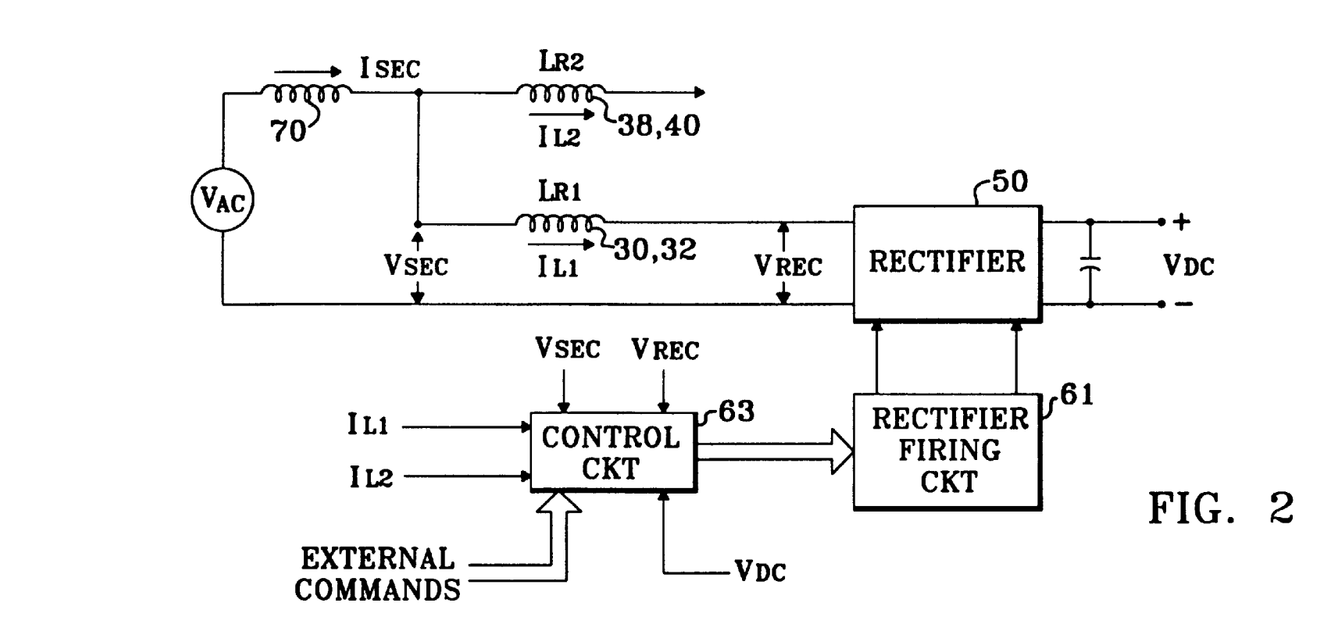
FIG. 2 is a simplified block diagram of the control and rectifier circuit of FIG. 1.
Figure 3:
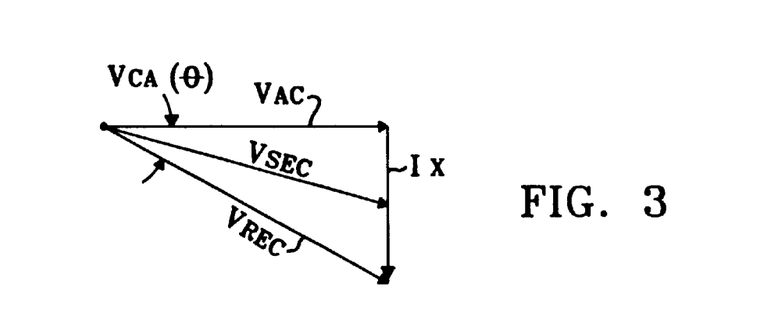
FIG. 3 is a vector phase diagram for the voltages and currents listed in FIG. 2.

Referring to FIG. 2, there is shown a simplified schematic representation of the transformer and rectifier circuit of FIG. 1. In FIG. 2, the transformer secondary winding is represented by a voltage source $V_{AC}$. This voltage source provides current through an inductance 70 which represents the transformer leakage reactance. The line reactance shown at 30, 32 and 38, 40 in FIG. 1 are represented by the reactors LR1 and LR2, respectively, in FIG. 2. The current supplied by the transformer secondary winding is indicated as $I_{SEC}$ and the secondary voltage is indicated as $V_{SEC}$ at the line reactors. The current through each of the line reactors is indicated as $I_{L1}$ and $I_{L2}$. Assuming an identical load on each of the inverter groups 1 and 2, the currents $I_{L1}$ and $I_{L2}$ through each of the line reactors LR1 and LR2 should be identical and equal to one-half of the current $I_{SEC}$. The input voltage at each of the rectifiers is indicated as $V_{REC}$. Referring to FIG. 3, there is shown a phase diagram which relates the voltages and currents discussed with regard to FIG. 2. The horizontal vector represents the input voltage $V_{AC}$ while the vertical vector IX represents the reactance of the transformer ($2\pi fL$) multiplied by the current through the transformer. The secondary voltage $V_{SEC}$ is shown as the middle vector while the lowest vector represents the rectifier input voltage $V_{REC}$. The phase diagram of FIG. 3 assumes that there is no reactive component of current, i.e., the secondary current is in phase with the AC input voltage $V_{AC}$ at the transformer primary. Since the transformer reactance is fixed, the desirable result illustrated in FIG. 3 can be achieved by controlling the value of $V_{REC}$. This value can be calculated using conventional techniques and achieved by controlling the switching devices in the rectifier so that the voltage drop across the line reactors 30, 32 is controlled so as to achieve the desired value of $V_{REC}$. Thus, there are two functions for the rectifier circuit, one of which is to control the output DC voltage while the other is to control the voltage drop across the line reactors so as to maintain unity power factor.

To operate the switching devices in the rectifier circuits in a manner similar to a step up chopper requires that the devices switch at a frequency which is a multiple of the AC waveform frequency. For example, it is generally desirable to operate the switching devices at a frequency in excess of 500 Hz in order to minimize losses due to harmonics in the transformer 20. The disadvantage of this higher switching frequency is the increased losses in the switching devices. Typically, the switching devices would be gate turn off (GTO) devices which can be switched into and out of conduction without using commutation circuits. As described above, when two of the switching devices are switched into conduction simultaneously so as to short circuit the transformer secondary winding 24 through the line reactors, current builds up in the line reactors and then, when the devices are switched off, the current flows through the diodes in parallel with the devices to charge the DC link. Applicants have found that it is not necessary to switch both devices in the rectifier circuit concurrently. More particularly, only one of the devices in each pair of switching devices need be modulated. The other device can be switched at zero crossings of the applied AC voltage $V_{REC}$. The advantage of this technique is that only one of the devices is subjected to the higher switching losses attributable to modulation or switching of the device at higher frequencies. Furthermore, the device which is being modulated can be alternated between the two devices so that the heating effects due to the switching losses can be shared between the two devices to relieve stress on any one of the devices.

A rectifier firing circuit 61 of conventional type provides the gating signals to the rectifiers 56 and 58. The firing circuit 61 is controlled by a microcomputer controller 63 in response to measured voltages and currents and external speed/torque commands. The functions implemented in control circuit 63 unique to the present invention are described in more detail in FIGS. 7–13.

Figure 4:
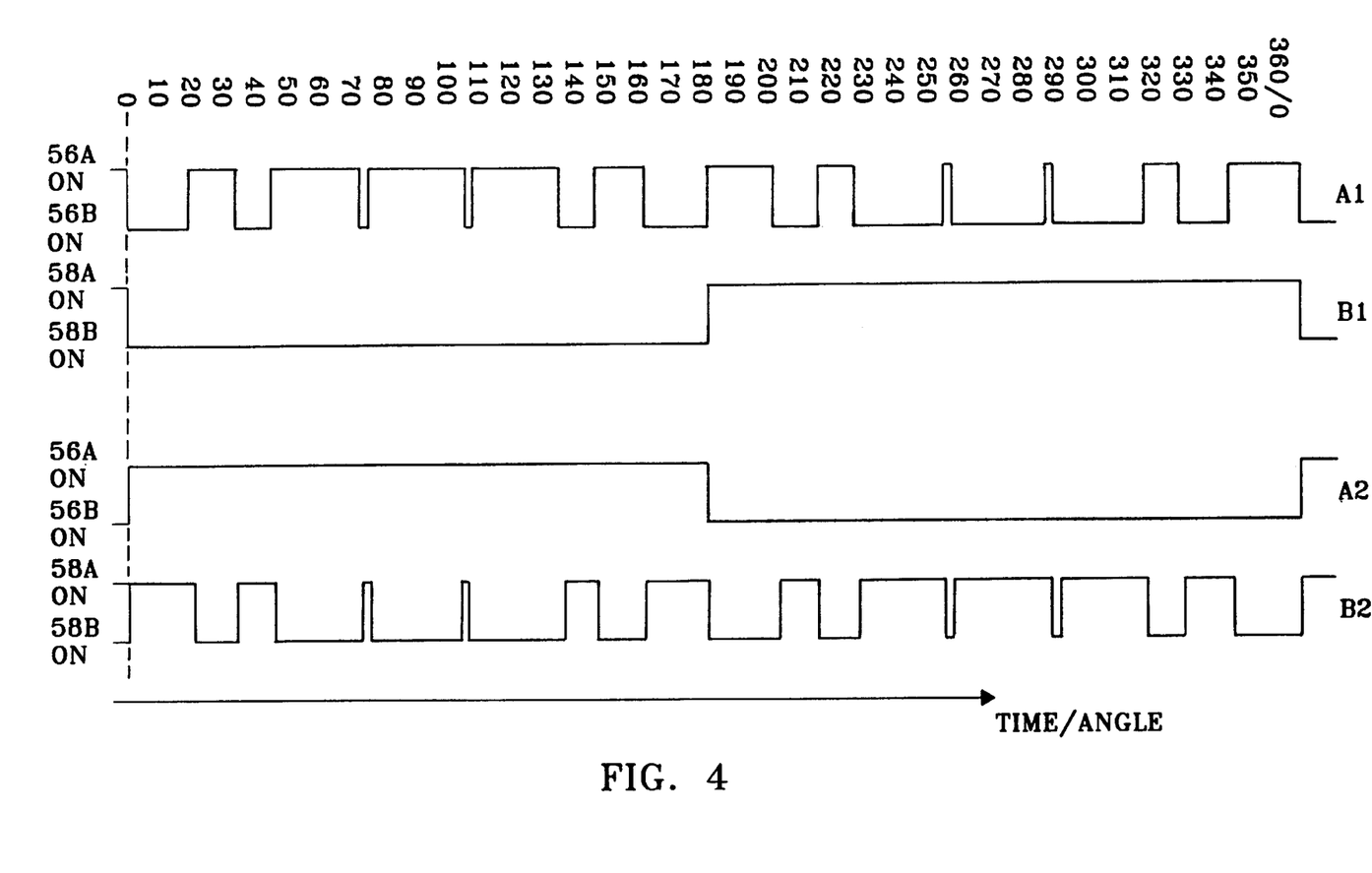
FIG. 4 illustrates switching waveforms for use with the rectifier of FIG. 2.

Referring now to FIG. 4, there is shown an example of a switching pattern or modulation cycle for the switching devices within one of the rectifiers 50 of inverter groups 1 and 2. The top line indicated at A1 represents the firing commands given to each of the switching devices 56A and 56B while the line B1 indicates the firing commands given to the switching devices 58A and 58B for an illustrative value of AC input voltage. The angle at which each of the devices is switched is shown across the top of FIG. 4 beginning at zero degrees and continuing to 360 degrees where the angle is related to the AC voltage $V_{REC}$. Beginning at zero degrees, the switching device 58B is gated into conduction and held into conduction through the first half cycle of the AC waveform. Beginning at 180 degrees, the switching device 58A is fired and held in conduction through the remaining 180 degrees of the AC waveform. Modulation of the switching devices 56A and 56B enables control of the DC output voltage and the voltage drop across the line reactors. Beginning at zero degrees, the device 56B is switched into conduction with 56A being non-conductive so that the secondary winding of the transformer is short circuited allowing current to build up through the line reactors. At about 20 degrees, the device 56B is switched out of conduction and device 56A switched into conduction causing the line reactor current to be transferred into the DC link. This pattern repeats as necessary to regulate the voltage across the line reactor and the DC output voltage. The firing patterns indicated at A2 and B2 are essentially the inverse of the firing patterns of A1 and B1. In A2, the devices 56A and 56B are switched in sequence with the AC waveform while the devices 58A and 58B are modulated. It will be noted that short circuiting of the secondary winding through the switching devices occurs at the same instances in both the sets of waveforms. For example, in A2, the device 56A is in conduction and during the period from zero to about 20 degrees, the device 58A is in conduction so that the secondary winding is short circuited through the DC positive bus 52 whereas the short circuiting through negative bus 54 occurred using modulation scheme A1, B1.

Figure 5:
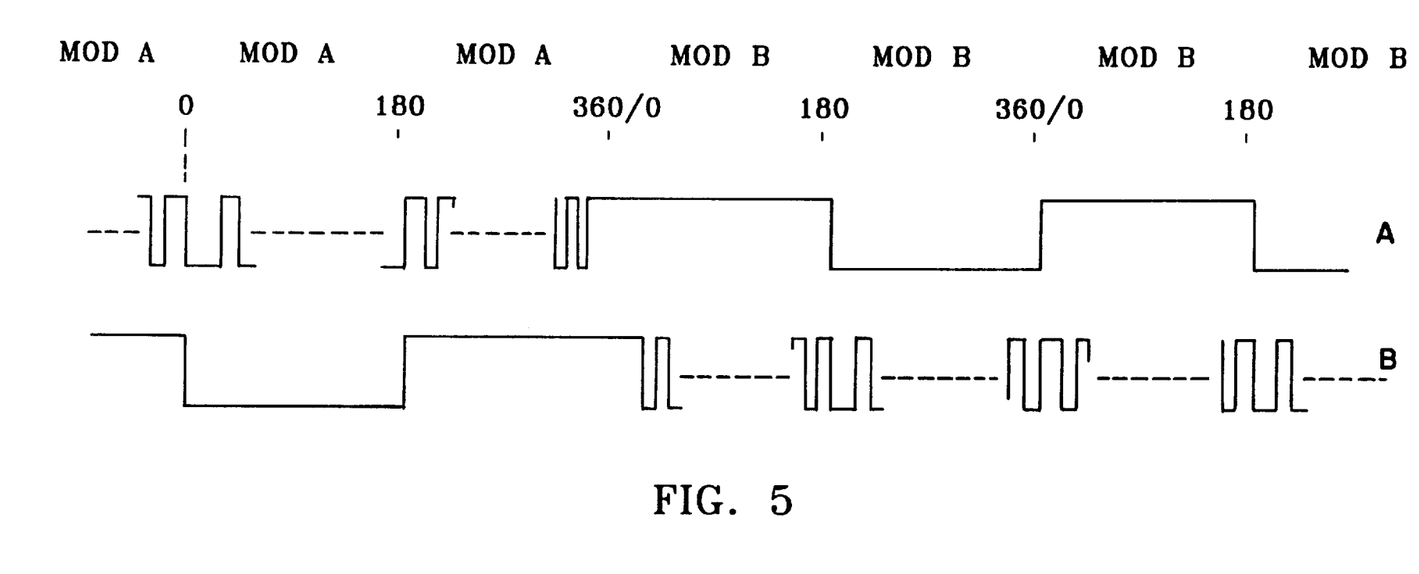
FIG. 5 illustrates alternating switching patterns for the control scheme illustrated in FIG. 4.

One method of switching between the modulation scheme shown in A1 and B1 and the modulation scheme shown in A2 and B2 is illustrated in FIG. 5. During the first part of the illustrated operation, the devices 56A and 56B are being modulated while the devices 58A and 58B are switched in sequence with the AC waveform. After the first full cycle of the AC waveform, the system switches to the alternate modulation scheme in which the devices 56A and 56B are now switched in synchronism with the AC waveform and the devices 58A and 58B are modulated. Note that the switching between the devices being modulated and the waveform synchronized devices occurs at zero crossings of the AC waveform $V_{REC}$. This technique minimizes the generation of harmonics which could be introduced into the AC power system. Switching between modulation schemes can occur at either 360° or 180°.

Figure 6:
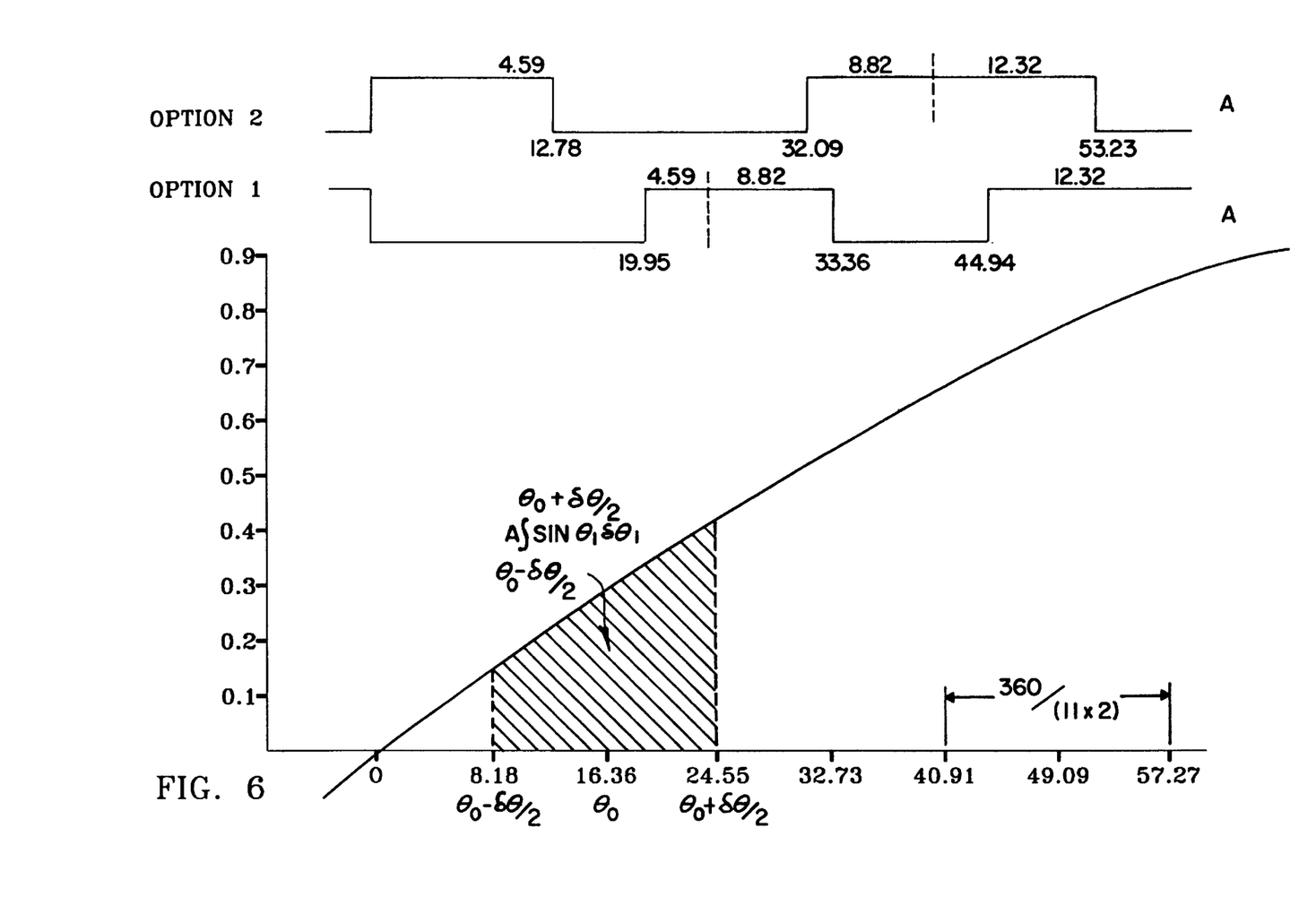
FIG. 6 illustrates switching waveforms in association with an AC input voltage for the rectifier of FIG. 1.

The discussion thus far has dealt with the control of one of the rectifiers in one of the inverter groups. In the system of the type illustrated in FIG. 1, where there are at least two inverter groups on one transit vehicle and there may be multiple transit vehicles connected together into a train, operation of the rectifier circuits in synchronism has still been found to create sufficient harmonics to interfere with telephone or radio communications along the train or transit right of way. In order to reduce the harmonics, applicants propose to phase shift the operation of the switching devices within the rectifiers so that the switching of the devices is not synchronized. This does not imply that the operation is phase shifted with respect to the transformer AC voltage but rather that the switching of the rectifiers is phase shifted with regard to each rectifier switching cycle. To better understand this concept, reference is now made to FIG. 6 which shows alternative switching cycles in conjunction with the rectifier AC input voltage $V_{REC}$. The switching cycles are labeled Option 1 and Option 2. Considering just the inverter groups 1 and 2, the switching cycle labeled as Option 1 could be utilized with the rectifier in inverter group number 1, while the switching cycle labeled as Option 2 could be utilized with the rectifier in inverter group number 2. For purposes of describing the present invention, it will be assumed that there are eleven switching cycles for each cycle of a 60 Hz AC input waveform, i.e., the switching frequency is 660 Hz. Accordingly, each switching cycle occupies 32.7 degrees of the AC waveform. The waveforms illustrated as options 1 and 2 only represent the modulation cycles and not the synchronized switching cycles of the non-modulated switching devices in the rectifier. Since each full switching cycle is 32.7 degrees, one half of the period of a switching cycle occupies 16.36 degrees. Since it is desirable to switch at zero crossings of the AC waveform, the half period of a switching cycle should be centered about zero crossing. More particularly, switching occurs in every half-period and it is desirable to have switching occur at a known point in order to be able to transition from one pattern to another with minimal harmonic generation. Zero crossing is an ideal point for transitioning. If a half switching period is centered around zero, regardless of sine wave magnitude, the average area (power) within the half-period will be zero. Therefore, both A and B switching can be kept the same throughout this half-period to produce a net zero average voltage during the half-period. Accordingly, since one half of the half period is 8.18 degrees, the first switching cycle starts at 8.18 degrees and continues to 24.55 degrees. The second half cycle starts at 24.55 degrees and continues to 40.91 degrees. When the signal is at a high value, the switching devices are energized so as to short circuit the transformer secondary winding to allow current to build up in the inductive reactance. In Option 2, the switching waveform is left justified during the first half-period and right justified during the second half-period. In Option 1, the switching waveform is right justified in the first half-period and left justified during the second half-period. Accordingly, the switching events are separated and shifted during each half-period to avoid synchronous operation of the switching devices in the two inverter groups. If Option 2 is applied to inverter group number 2 and Option 1 applied to inverter group number 1, it can be seen that the switching cycle during which the transformer secondary winding is short circuited has been shifted between the inverter groups so that one inverter group short circuits the secondary during one part of the switching cycle and the other rectifier in the other inverter group short circuits the transformer secondary during another part of the switching cycle. Depending on power requirements, there may be some overlap of the switching cycles. Note for example that between 44.94 degrees and 53.23 degrees that both the rectifiers have short circuited the transformer secondary winding. However, during at least the portion from 33.36 degrees to 44.94 degrees, only the inverter group number 2 had short circuited the transformer secondary winding. Accordingly, this technique switches the two inverter groups independently and in a phase-shifted relationship so that harmonic production is reduced. As an alternative to switching the inverter groups within a single car, both inverter group number 1 and inverter group number 2 could be operated in synchronism and the inverter groups in another car could be shifted using one of the other options. More particularly, both inverter group number 1 and inverter group number 2 could be operated in accordance with option number 1 while inverter groups in a second car could be operated in accordance with option number 2. Still further, it is also possible to introduce a third option in which the switching cycle is centered rather than left or right justified. Such a technique could be used with either multiple transit cars or in individual transit cars in which there were three inverter groups. To better understand the generation of the angles at which the switching occurs, the following equations show generation of the on and off times for the switching cycles of Option 2. If pwm ratio (switching freq. ratio)=11

$$\delta\theta = \frac{360}{11 \times 2} = 16.36°$$

If the amplitude of the ratio between the rectifier AC input voltage and rectifier DC output voltage is defined as A and set equal to 1, i.e., A=1, in the first interval $\theta_0$=16.36

$$\begin{aligned} \text{AverageInput } V &= \frac{1}{\delta\theta}\Big|_{8.18}^{24.55} \sin\theta d\theta \\ &= \frac{180}{\pi \times 16.36}(-\cos 24.55 + \cos 8.18) \\ &= 3.50 \times 0.08 = 4.59° \end{aligned}$$

$T_{ON} = 16.36 \times 0.28 = 4.59°$

Similarly for second interval $\text{Area} = \frac{180}{\pi \times 16.36}(-\cos 40.91 = \cos 24.55) = 0.54$ $T_{ON} = 0.54 \times 16.36 = 8.82$ Where $T_{ON}$ represents the angular conduction time of the switching devices 56, 58 during a switching cycle.

Figure 7:
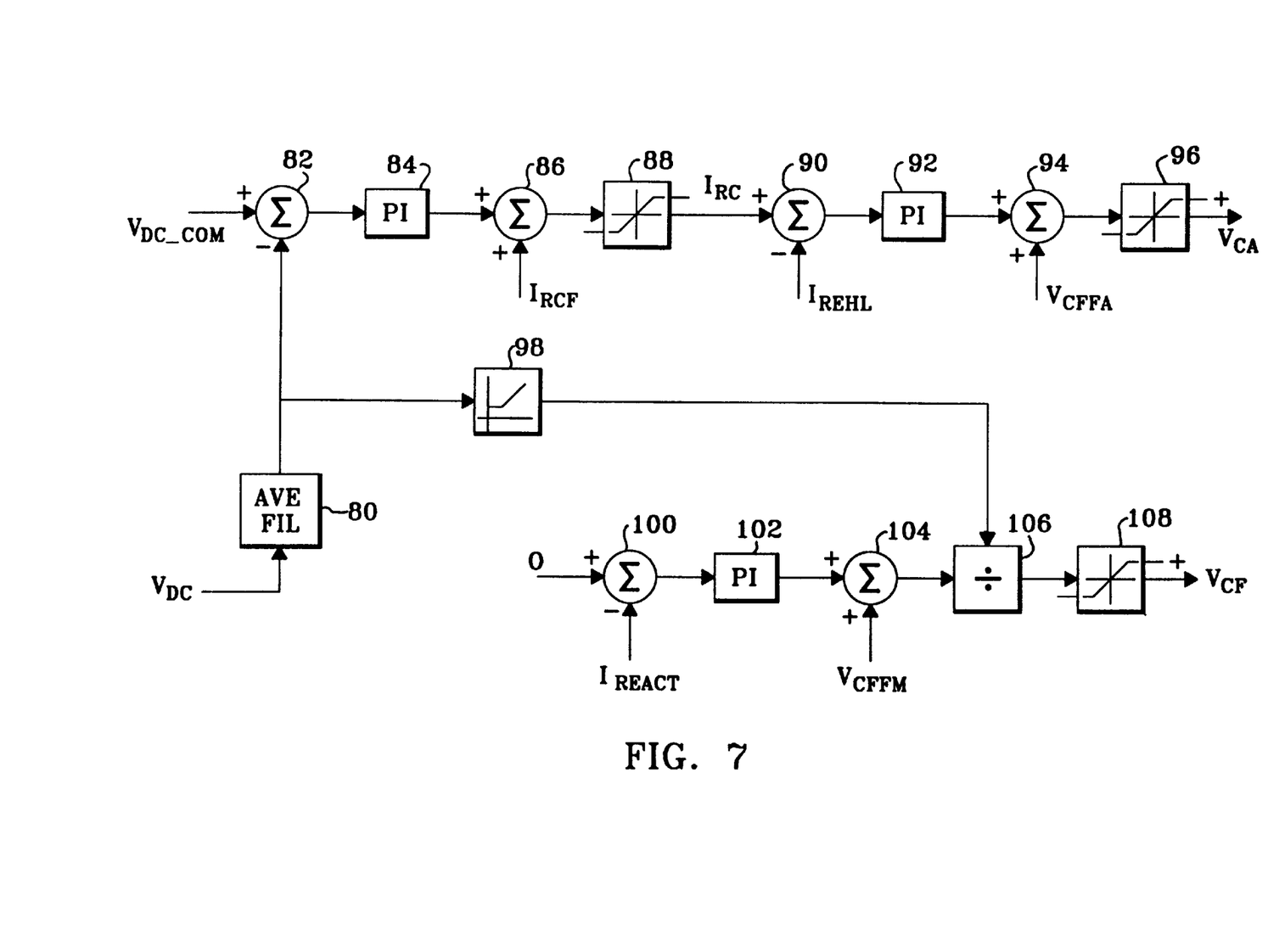
FIG. 7 is a simplified block diagram for the control circuit for the rectifier of FIG. 1.
Figure 8:
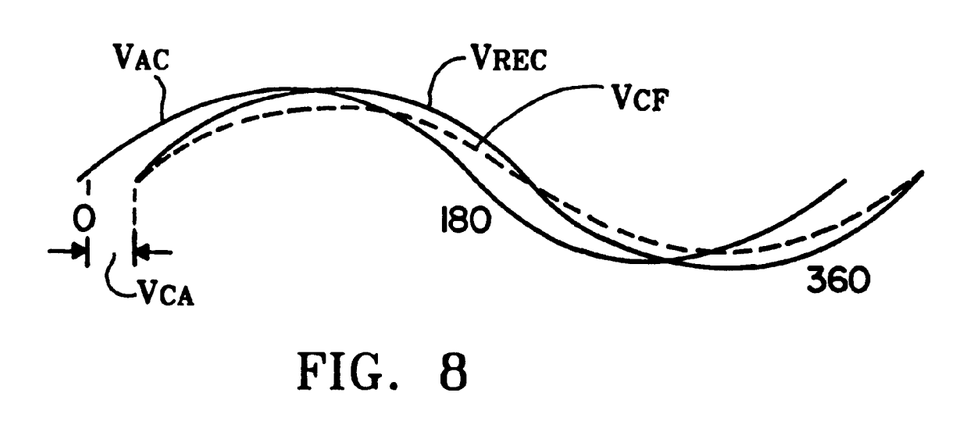
FIG. 8 illustrates voltage waveforms and phase shifts described with regard to FIG. 7.

Referring now to FIG. 7, there is shown a simplified block diagram of a regulator for controlling the operation of the rectifier within the inverter groups 1 and 2 in the manner described above. The output signals developed by the circuit of FIG. 7 are the voltage command angle $V_{CA}$ and voltage command fraction $V_{CF}$. The $V_{CA}$ signal represents the phase shift between the $V_{AC}$ input voltage at the transformer and the rectifier AC input voltage $V_{REC}$. The $V_{CF}$ signal represents the ratio of the rectifier AC input voltage $V_{REC}$ to the magnitude of the DC voltage $V_{DC}$ out of the rectifier. Referring briefly to FIG. 8, there is shown a graph of the three voltage waveforms representing $V_{AC}$, the rectifier AC voltage $V_{REC}$ and the voltage $V_{CF}$ fraction. As seen in FIG. 8, $V_{CA}$ is the phase shift between the AC input voltage $V_{AC}$ and the rectifier AC volts $V_{REC}$. The $V_{CF}$ signal is in phase with rectifier AC volts $V_{REC}$ but its amplitude is varied by the magnitude of the output voltage $V_{DC}$. The partial sine wave shown in FIG. 6 is actually a portion of the $V_{CF}$ waveform and has a magnitude typically less than 1.

Figure 9:
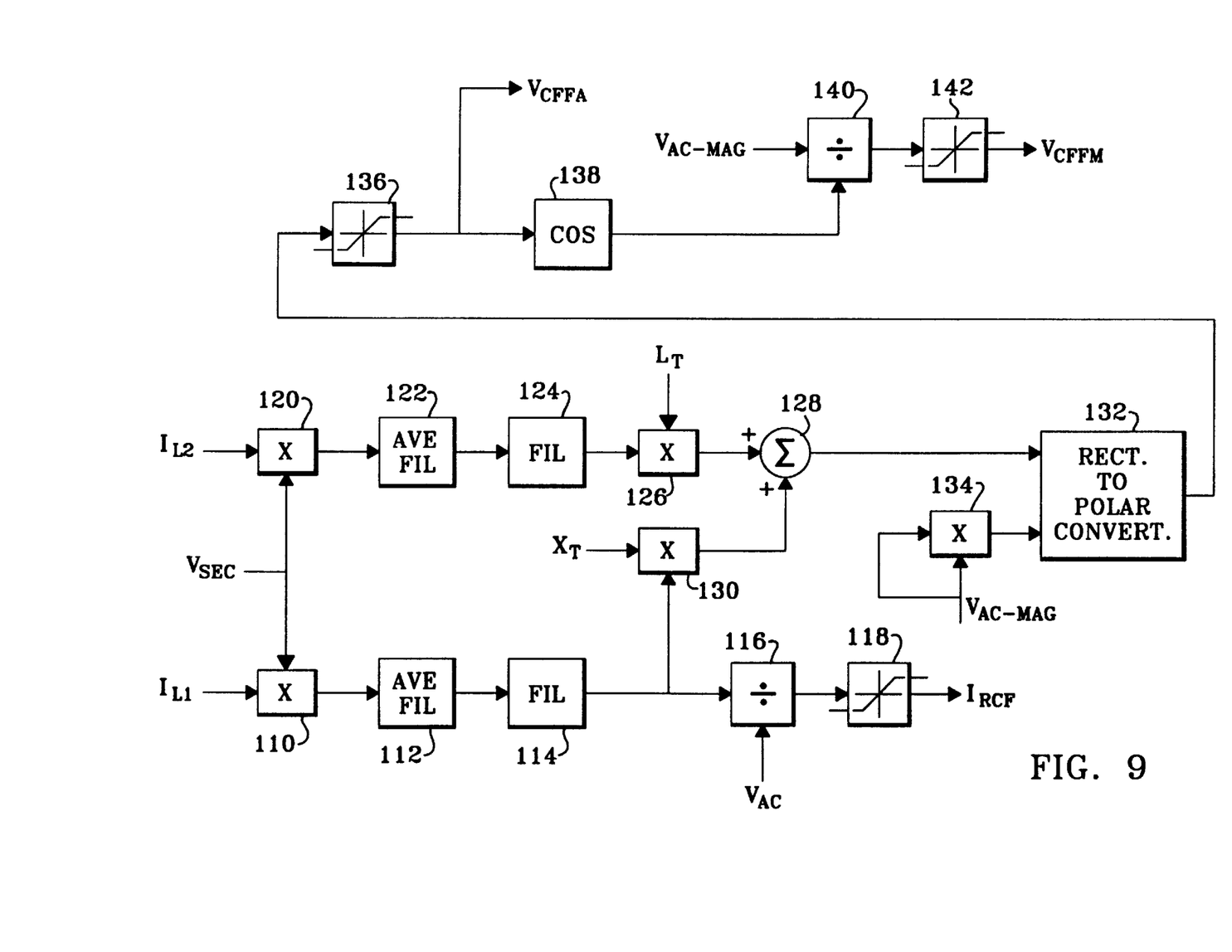
FIG. 9 is a simplified block diagram of a feed forward control for the rectifier of FIG. 1.

Referring back to FIG. 7, the primary inputs to the regulator are the DC command signal indicated as VDC_COM and the measured value of $V_{DC}$ (the rectifier output voltage). The measured value of $V_{DC}$ is processed through an averaging filter 80 to remove all harmonics. Since the power is at 120 Hz and there are harmonics due to PWM operation, there will always be 60 Hz multiple frequencies in the DC voltage and other feedback signals. The resultant filtered $V_{DC}$ signal is then summed in block 82 with the commanded voltage signal VDC_COM. The averaging filter 80 is a significant feature of the present invention and will be described in more detail with regard to FIG. 13. The error signal generated by block 82 is passed through a proportional plus integral circuit 84 of a type well known in the art. After processing through block 84, the error signal is summed in block 86 with a signal representative of the desired real current, $I_{RCF}$. The generation of the signal $I_{RCF}$ is shown in FIG. 9. The $I_{RCF}$ signal is a feed forward function which improves the response of the system. The summed signal from block 86 is next applied to a limit circuit 88. The output of the limit circuit is an amplitude limited real current command signal $I_{RC}$. The $I_{RC}$ command signal is combined with a signal $I_{REAL}$ (representative of the real component of current in transformer secondary winding 24) in block 90 and the difference signal supplied to another proportional plus integral circuit 92. The output signal from the proportional plus integral circuit 92 is used as a regulator correction factor to a voltage command feed forward angle signal $V_{CFFA}$ in summing junction 94. The resultant signal is then applied to another amplitude limiting circuit 96 whose output is then the voltage command angle signal $V_{CA}$ described with respect to FIG. 8.

The filtered $V_{DC}$ signal from average filter 80 is also applied to an amplifier 98 which serves to limit the minimum value of $V_{DC}$ to some value greater than zero. Since the $V_{DC}$ signal is the denominator in the calculation of the voltage fraction signal $V_{CF}$, the value of $V_{DC}$ must be limited to prevent division by zero. The value of the rectifier AC input voltage $V_{REC}$ is derived by setting the desired reactive component of current in the AC input circuit to be zero and summing that current with the actual reactive current $I_{REACT}$ in summing junction 100. The difference signal is then applied to a proportional plus integral circuit 102 and the resultant error signal supplied to summing junction 104. In summing junction 104, the error regulator output signal is combined with a feed forward signal $V_{CFFM}$ representative of a computed value or best estimate of the magnitude of the voltage $V_{REC}$. The summed output of summation circuit 104 represents the magnitude of the AC voltage $V_{REC}$ at the input of the rectifier circuit. This voltage is applied to one input of a divider circuit 106 where it is divided by the value of the DC voltage so that the output becomes the value of $V_{CF}$. The signal is further restrained by application to a voltage limiter circuit 108 which simply limits the maximum value of $V_{CF}$. The output signal $V_{CF}$ thus appears at the output of the limiter circuit 108. By adjusting the value of $V_{CF}$, the reactive component of current in the input circuit to the rectifiers can be adjusted to zero.

Turning now to FIG. 9, there is shown a simplified block diagram which illustrates how the feed forward commands utilized in the block diagram of FIG. 7 are generated. The input signals to this block diagram are the measured values of rectifier input current $I_{L1}$ and $I_{L2}$ and secondary volts $V_{SEC}$ as shown in FIG. 2. Both the current for the first inverter group and the current for the second inverter group are treated generally identically. The current supplied to the first inverter group is identified as $I_{L1}$ and is coupled to a multiplier 110 whose other input terminal is connected to receive the signal $V_{SEC}$ representative of secondary voltage. The output of the multiplier is the power supplied through the series inductor LR1 to the rectifier 50 in inverter group 1. The signal generated by the multiplier 110 is applied to an averaging filter 112 and then through a second filter 114. The averaging filter 112 removes harmonics while the filter 114 provides a delay for control stabilization and is of a common type. The filtered power signal is applied to a divider 116 having another input connected to receive a signal representative of the absolute magnitude of the AC input voltage $V_{AC}$ so that the output voltage of the divider 116 is a signal representative of the real value of current identified as $I_{RCF}$. This signal is applied to a limiter circuit 118 which limits the maximum value of the signal now identified as the real component of the commanded feed forward current $I_{RCF}$. Feed forward signals such as $I_{RCF}$ are normally based on commanded values. In this system, the feed forward signals are generated from measured values of secondary voltage and current. Based on these measured values, expected values of the phase angle $V_{CA}$, the voltage magnitude $V_{REC}$ and current $I_{REAL}$ can be calculated. In a more conventional feed forward system, the signals used would be speed and torque commands to the inverter or motors.

The measured current applied to the other rectifier 50 in inverter group 2 is coupled to a multiplier 120 which also receives a signal representative of secondary voltage. The resulting power output signal is then applied through an averaging filter 122 and a standard filter 124 to develop a filtered power signal comparable to the signal from filter 114. The filtered power signal from filter 124 is applied to still another multiplier 126 having another input connected to receive a signal representative of the reactance $L_T$ of the power transformer. The product of the filtered power command signal and the transformer reactance is then applied to a summing circuit 128. A second input of the summing circuit 128 is derived from the product of the filtered power command signal from block 114 and the known value of the total reactance $X_T$ of the power input circuit from block 130. The summation of these two products is then applied to an angle circuit 132. A second input to the angle circuit 132 is the square of the absolute magnitude ($V_{AC-MAG}$) of the AC input voltage as produced by a multiplier 134. The block 132 is a conventional cartesian to polar coordinate converter of a type well known in the art which provides a single output vector value representing magnitude and angle. The angle value represents the angle between $V_{AC}$ and $V_{REC}$ (FIG. 3). The output signal from block 132 is applied to a voltage limiter circuit 136. The limited value out of the block 136 is the voltage command feed forward angle signal $V_{CFFA}$ whose use was described with regard to FIG. 7. A cosine circuit 138 computes the cosine value of this angle and applies it as a divisor into divider circuit 140. The numerator used in the divider circuit 140 is the absolute value of the magnitude of the $V_{AC}$ input voltage ($V_{AC-MAG}$). The output of divider 140 is the magnitude of the voltage command feed forward signal $V_{CFFM}$. This value is limited by limiter circuit 142 to preselected minimum and maximum values. Note that $V_{CFFM}$ is the desired value of $V_{REC}$ for unity power factor. All of the functions thus far described are based on the following relationships derived from FIG. 3.

If voltage and current are in phase $$I = \frac{P}{V_{ACIN}}$$

$$\tan\theta = \frac{I_{WL}}{V_{ACIN}}$$

$$= -\frac{P_{WL}}{(V_{ACIN})^2}$$

$$\cos\theta = \frac{V_{ACIN}}{rect - ACvolts}$$

Therefore $$rect - acvolts = \frac{V_{ACIN}}{\cos\theta}$$

Figures 10, 11:
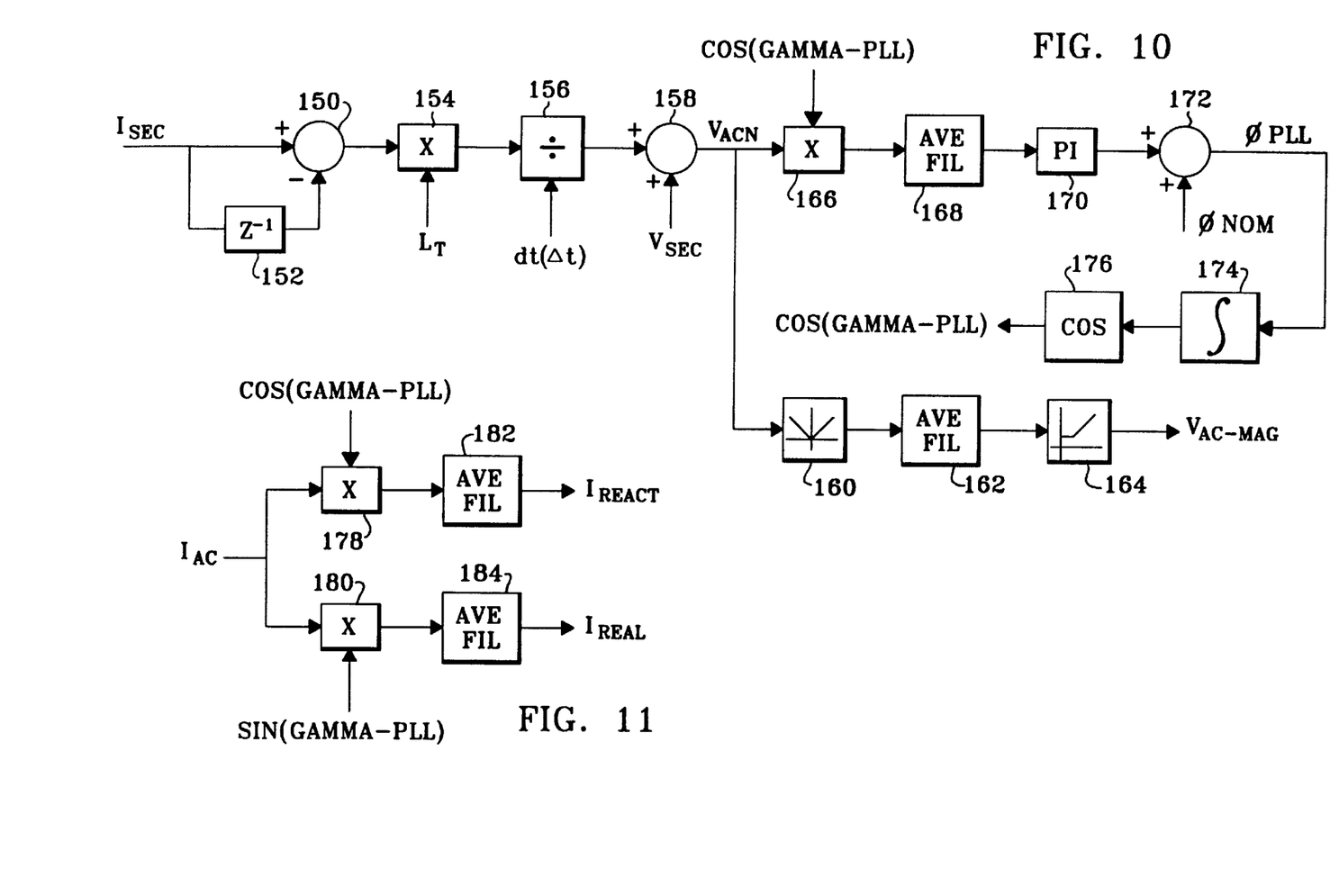
FIG. 10 is a simplified block diagram of a phase locked loop for use with the rectifier of FIG. 1.
FIG. 11 is a block diagram of a method for developing the reactive and real components of current for use in the block diagram of FIG. 7.

Turning now to FIG. 10, there is shown a simplified block diagram for a phase locked loop in accordance with the present invention which may be used in conjunction with the rectifier control circuit. The phase locked loop synchronizes the switching signals to the AC voltage waveform and maintains synchronization by adjusting the switching frequency with any change AC frequency. The output signals developed by the circuit shown in FIG. 10 are the absolute magnitude of $V_{AC}$ input and the instantaneous angle of the $V_{AC}$ input signal. The input to the block diagram of FIG. 10 is the value of secondary current $I_{SEC}$ from the secondary winding of the power transformer. The value of $I_{SEC}$ is applied to a summing circuit 150 and to a delay circuit 152. The output of the delay circuit 152 is applied to another input of the summing circuit 150 where it is subtracted from the value of $I_{SEC}$. The resulting output of the summing circuit 150 represents the change in current or a differential current value di. This value is applied to a multiplier 154 which multiplies the value of di by the transformer inductance $L_T$ which is applied to a second input terminal of multiplier 154. The output of the multiplier 154 is thus Ldi where L represents the transformer inductance but could also include the catenary inductance if it was desired to regulate the system to the source voltage rather than to the transformer voltage. The value of Ldi is applied to an input of a divider circuit 156 where it is divided by a value representative of a selected time increment dt. The output of the divider circuit 156 becomes Ldi/dt which represents the transformer voltage drop due to transformer reactance. The value of the transformer voltage drop is then added to the measured value of secondary volts $V_{SEC}$ (see FIG. 3) in a summing junction 158 and the output of the junction 158 becomes the value of voltage at winding 24 corrected for the winding inductive reactance and is designated $V_{ACN}$. This value of $V_{ACN}$ is applied to an absolute value circuit 160 of a type well known in the art and the resultant output signal is then applied through an averaging filter 162 and to a voltage limit circuit 164 whose output then becomes the absolute magnitude of the AC input voltage at the power transformer where the AC input voltage is equal to the turns ratio of the secondary winding to the primary winding multiplied by the voltage on the primary winding. Note that the value of $V_{ACN}$ was obtained without measurement of the primary voltage.

The AC input voltage $V_{ACN}$ is also applied to a multiplier 166 where it is multiplied by the cosine of the angle of $V_{ACN}$. The $V_{ACN}$ angle is identified as gamma PLL and represents the phase locked loop angle. The output of the multiplier 166 represents the phase locked loop error which is applied to the averaging filter 168 and then to a proportional plus integral circuit 170. The error signal at the output of the PI circuit 170 is applied to a summing junction 172 where it is offset by the frequency $_{NOM}$ of the AC input. Since the AC input is a fixed frequency of 60 Hz in normal transit car operation (since the signal is derived from conventional power lines) the value of the signal $_{NOM}$ applied to the summing junction 172 is 60 Hz. The output of the summing junction 172 is the nominal frequency $_{NOM}$ plus any error in the frequency. This signal is then applied to an integrator 174 which integrates the frequency signal to derive the angle signal gamma PLL. The gamma PLL signal is applied to a cosine circuit 176 to derive the signal cosine gamma PLL.

The calculation of the real and reactive components of the AC current is shown in FIG. 11. The input to this circuit is the measured value of $I_{AC}$ to the rectifier. This value is applied to two separate multipliers 178 and 180. In multiplier 178, the value of IAC is multiplied by the cosine of gamma PLL to produce the reactive component of current. This value is then processed through an averaging filter 182 to yield the filtered reactive current component $I_{REACT}$ used in FIG. 7. In multiplier 180, the sine of the gamma PLL angle is multiplied by the AC current to derive the real value of current $I_{REAL}$ and this value is then processed through an averaging filter 184 to yield the filtered real value of $I_{REAL}$ used in FIG. 7.

Figure 12:
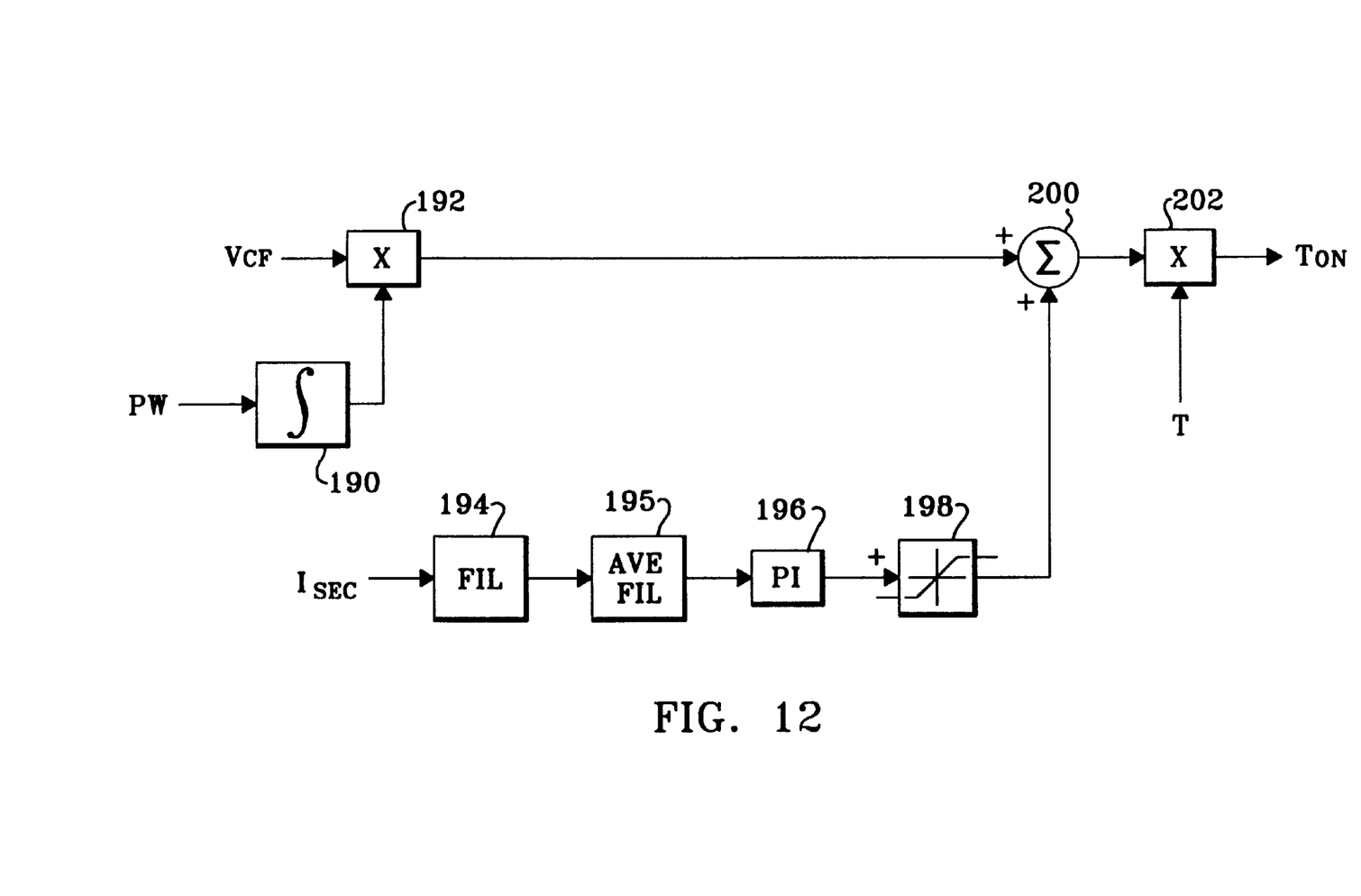
FIG. 12 is a simplified block diagram of a DC offset correction circuit in conjunction with a circuit for establishing the conduction time of the individual switching devices in the rectifier of FIG. 1.

FIG. 12 illustrates a functional block diagram of DC offset correction in a circuit which develops the switching times, i.e., the time which each switching device remains in conduction in order to regulate $V_{REC}$ and $V_{DC}$. For sine wave operation, the average value of transformer secondary current should be zero. The circuit of FIG. 12 compensates for any DC offset to maintain a zero current average. The switching time $T_{ON}$ may be in either time or angle increments and is used in angle increments in the description of the waveforms of FIG. 6. The input signals are $V_{CF}$ (for voltage magnitude), $I_{SEC}$ for current and PW for the width of each interval (the half-period interval described in FIG. 6). The PW interval is given in terms of degrees or angle $\theta$ and the block 190 computes the integral of the sine of $\theta$, i.e., $$\int \sin\theta d\theta$$

as described infra with regard to the mathematical derivation of ON and OFF times. Multiplier 192 multiplies the integral by voltage amplitude ratio $V_{CF}$ ("A" in the prior discussion of FIG. 6) to obtain the nominal ON time. This value is adjusted, i.e., each "ON" pulse time/angle is adjusted to correct for DC offset so that $I_{SEC}$ average equals zero over each cycle. The offset value is derived from $I_{SEC}$ by filtering in blocks 194 and 195 to remove harmonics and stabilize the control loop, developing an error in conventional proportional-plus integral circuit 196 and limiting the maximum adjustment value in limiter circuit 198. The function of the offset correction is to minimize even harmonics in $I_{SEC}$. The offset value is then summed with the nominal "ON" time in block 200 and the corrected ON time multiplied by the sampling rate T in multiplier 202. The rate T can be in degrees or time increments depending on the desired units of $T_{ON}$.

Figure 13:
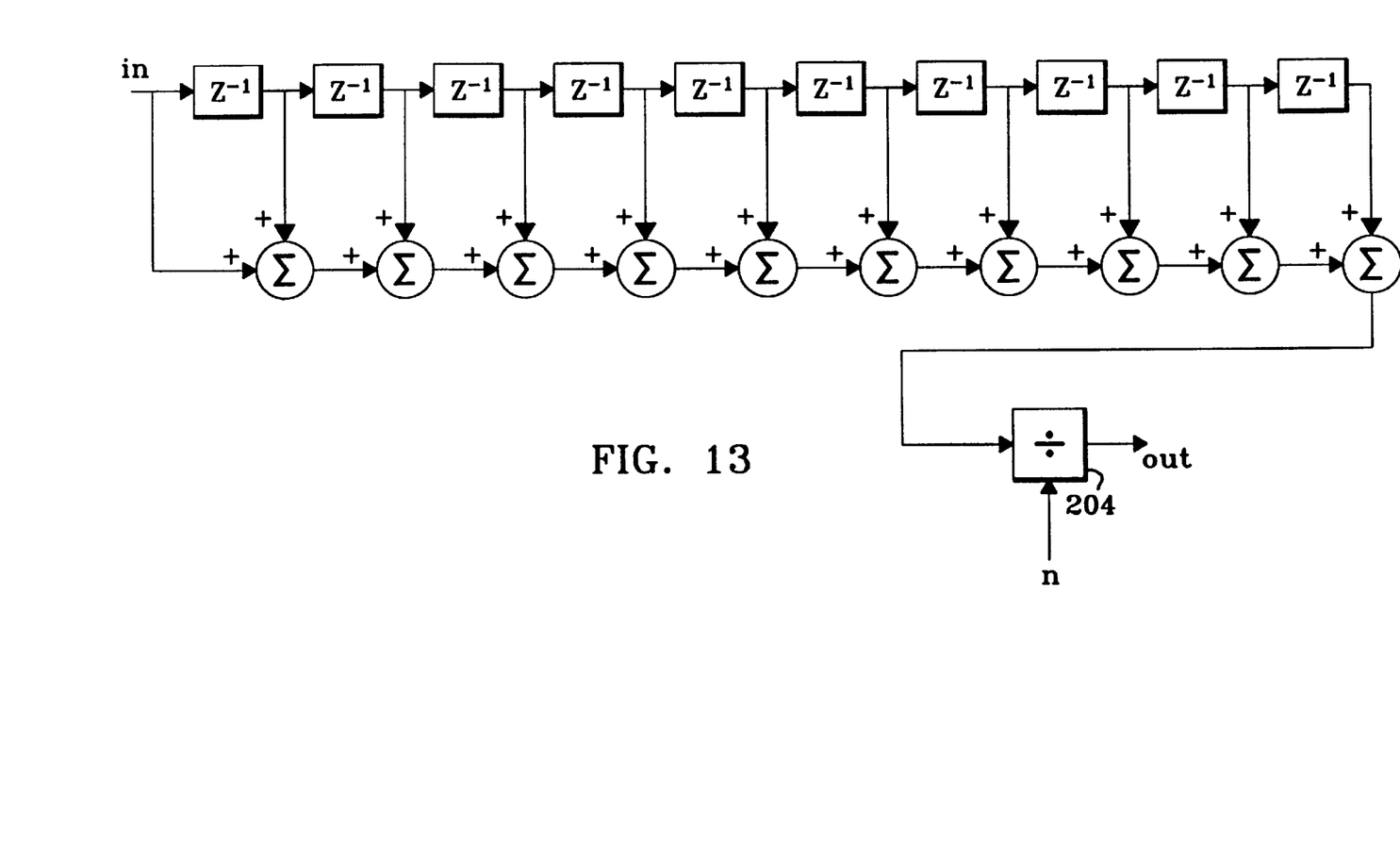
FIG. 13 is a functional block diagram of an averaging filter in accordance with the present invention.

Referring to FIG. 13, there is shown a simplified block diagram of the averaging filter referred to throughout the preceding disclosure. The averaging filter comprises a sequence of substantially identical blocks, each of which comprises a summing junction $\Sigma$ and a time delay circuit $Z^{-1}$. The number of blocks is one less than the chopping frequency, i.e., if each AC sinewave is switched 11 times in each cycle, there will be 10 blocks in the averaging filter. The result of the repetitive delaying and summing is to construct a summation of the present plus the last ten samples of the input (11 samples total). The result is applied to a divider circuit 204 and divided by N (11 in this example), where N is the number of switching periods in each cycle of the AC waveform. In the diagram of FIG. 13, the switching period of the switching devices in the rectifier is 11 times the fundamental frequency or 660 Hz so that there are ten blocks making up the averaging filter. Note that there is a balance between the losses in the switching devices in the rectifier which are minimized at low frequency and the losses in the power transformer which are lower with higher frequency. The value of 11 selected for the present application is a balance between the desire to minimize switching losses and to reduce the harmonic losses in the transformer.

While the invention has been described in what is presently considered to be a preferred embodiment, many variations and modifications will become apparent to those skilled in the art. Accordingly, it is intended that the invention not be limited to the specific illustrative embodiment but be interpreted within the full spirit and scope of the appended claims.

What is claimed:

1. A method for operating a pulse width modulated (PWM) rectifier, said rectifier comprising at least a first and a second switching device serially connected between relatively positive and relatively negative DC output busses, a third and a fourth switching device serially connected in parallel with said first and second devices between said DC output busses, junctions intermediate each pair of switching devices being coupled to receive AC power from an AC electric transmission system, the method including the steps of:

pulse width modulating only one of said switching devices in each pair of switching devices at any time at a frequency substantially higher than a frequency of the AC power; and operating another of the switching devices in each pair of switching devices in synchronism with a waveform of the AC power.

2. The method of claim 1 and including the step of periodically alternating PWM operation between said switching devices in each pair of switching devices.

3. The method of claim 2 and including the step of alternating PWM operation by switching between the switching devices at zero crossings of the AC waveform from the AC transmission system.

4. The method of claim 3 and including the step of phase locking the PWM operation to the AC transmission system.

5. The method of claim 4 and including a transformer having a primary winding coupled to the AC transmission system and a secondary winding coupled to supply power to the rectifier, an inductor serially connected between the rectifier and the secondary winding, a control system for controlling a DC voltage at the output of each rectifier, the method including the further step of controlling voltage across the inductor such that current through the inductor is in phase with the voltage on the transformer primary winding.

6. A method for minimizing heating effects on semiconductor switching devices in a pulse width modulated (PWM) rectifier of the type including at least a first and a second switching device serially connected between relatively positive and relatively negative DC output busses, a third and a fourth switching device serially connected in parallel with said first and second devices between said DC output busses, junctions intermediate each pair of switching devices being coupled to receive AC power from an AC electric transmission system, the method comprising the steps of:

operating only one of said switching devices in each pair of switching devices in a PWM mode at any time; and periodically alternating PWM operation between said switching devices in each pair of switching devices.

7. A method for operating semiconductor switching devices in a pulse width modulated (PWM) rectifier of the type including at least a first and a second switching device serially connected between relatively positive and relatively negative DC output busses, a third and a fourth switching device serially connected in parallel with said first and second devices between said DC output busses, junctions intermediate each pair of switching devices being coupled to receive AC power from an AC electric transmission system, the AC power being supplied to the rectifier through a power transformer and including at least one pump-up inductor coupled between the transformer and the rectifier, the method comprising the step of controlling the voltage across the at least one inductor such that current through the inductor is in phase with the voltage on the transformer primary winding.

8. In a control system for a PWM rectifier, including a transformer for supplying alternating current (AC) power and at least one series connector inductor between the transformer and rectifier, a method for establishing a phase angle and voltage magnitude of AC voltage applied to the rectifier such that current through the inductor is substantially in phase with the voltage at the transformer, the method comprising the steps of:

computing an error signal representative of the difference between a desired direct current (DC) output voltage from the rectifier and a measured value of DC output voltage;

summing the error signal with a signal representative of a computed value of real current to the rectifier to produce a commanded real current signal;

comparing the commanded real current signal to an actual value of real current to produce a current error signal; and summing the current error signal with a computed value representative of the phase angle between the transformer voltage and current to produce a phase angle command.

9. The method of claim 8 and including the further steps of:

summing a signal representative of a reactive component of current with a signal representative of a computed value of voltage applied to the rectifier to derive a signal representative of input voltage at the rectifier;

dividing the computed rectifier input voltage signal by a measured value of DC output voltage to develop a voltage ratio; and adjusting the voltage ratio by controlling the PWM operation of the rectifier to force the signal representative of the reactive component of current towards zero.

10. The method of claim 9 and including the further step of compensating for direct current offset by adjusting a time duration of each conduction interval of the rectifier switching devices in proportion to a value of any offset current.

11. A control for a pulse width modulated (PWM) rectifier of a type comprising at least a first and a second switching device serially connected between relatively positive and relatively negative DC output busses, a third and a fourth switching device serially connected in parallel with said first and second devices between said DC output busses, junctions intermediate each pair of switching devices being coupled to receive AC power from an AC electric transmission system, comprising:

PWM means or pulse width modulating only one of said switching devices in each pair of switching devices at any time at a frequency substantially higher than a frequency of the AC power; and means for operating another of the switching devices in each pair of switching devices in synchronism with a waveform of the AC power.

12. The control of claim 11 wherein said PWM means periodically alternates PWM operation between said switching devices in each pair of switching devices.

13. The control of claim 12 wherein said PWM means alternates PWM operation by switching between the switching devices at zero crossings of the AC waveform from the AC transmission system.

14. The control of claim 13, further comprising a phase locked loop for phase locking the PWM operation to the AC transmission system.

15. The control of claim 14, further comprising a transformer having a primary winding coupled to the AC transmission system and a secondary winding coupled to supply power to the rectifier, an inductor serially connected between the rectifier and the secondary winding, the control controlling voltage across the inductor such that current through the inductor is in phase with the voltage on the transformer primary winding.

16. A control system for a PWM rectifier, including a transformer for supplying alternating current (AC) power and at least one series connector inductor between the transformer and rectifier, comprising:

means for computing an error signal representative of the difference between a desired direct current (DC) output voltage from the rectifier and a measured value of DC output voltage;

a first summer for summing the error signal with a signal representative of a computed value of real current to the rectifier to produce a commanded real current signal;

a comparator for comparing the commanded real current signal to an actual value of real current to produce a current error signal; and a second summer for summing the current error signal with a computed value representative of the phase angle between the transformer voltage and current to produce a phase angle command such that a phase angle and voltage magnitude of AC voltage applied to the rectifier result in current through the inductor substantially in phase with the voltage at the transformer.

17. The control system of claim 16, further comprising:

a third summer for summing a signal representative of a reactive component of current with a signal representative of a computed value of voltage applied to the rectifier to derive a signal representative of input voltage at the rectifier;

a divider for dividing the computed rectifier input voltage signal by a measured value of DC output voltage to develop a voltage ratio; and means for adjusting the voltage ratio by controlling the PWM operation of the rectifier to force the signal representative of the reactive component of current towards zero.

18. The control system of claim 17, further comprising a correction circuit (191) for compensating for direct current offset by adjusting a time duration of each conduction interval of the rectifier switching devices in proportion to a value of any offset current.

19. The method of claim 1 and including a transformer having a primary winding coupled to the AC transmission system and a secondary winding coupled to supply power to the rectifier through the junctions intermediate each pair of switching devices and including a first and a second inductor, the first inductor being serially connected between one of the junctions intermediate one pair of switching devices and a first terminal of the secondary winding, the second inductor being connected between another of the junctions and a second terminal of the secondary winding, a control system for controlling a DC voltage at the output of the rectifier, the method including the further step of controlling voltage across each inductor such the output of current through each inductor is in phase with the voltage on the transformer primary winding.

20. The control of claim 11 and including a transformer having a primary winding coupled to the AC transmission system and a secondary winding coupled to supply power to the rectifier through the junctions intermediate each pair of switching devices and including a first and a second inductor, the first inductor being serially connected between one of the junctions intermediate one pair of switching devices and a first terminal of the secondary winding, the second inductor being connected between another of the junctions and a second terminal of the secondary winding, a control system for controlling a DC voltage at the output of the rectifier, the method including the further step of controlling voltage across each inductor such the output of current through each inductor is in phase with the voltage on the transformer primary winding.

* * * * *